Nov. 7, 1967 L. V. GEWISS 3,351,441
SHAPE, CONSTITUTION AND PROCESSES FOR MANUFACTURING MATERIALS
DERIVED FROM DEVELOPABLE CHEVRONED CONFIGURATIONS
Filed Nov. 1, 1963 6 Sheets-Sheet 2

Inventor
Lucien Victor Gewiss

By Lane, Aitken, Dunner & Ziems
Attorneys

Nov. 7, 1967 L. V. GEWISS 3,351,441
SHAPE, CONSTITUTION AND PROCESSES FOR MANUFACTURING MATERIALS
DERIVED FROM DEVELOPABLE CHEVRONED CONFIGURATIONS
Filed Nov. 1, 1963
6 Sheets-Sheet 3

Inventor
Lucien Victor Gewiss

By Lane, Aitken, Dunner & Ziems
Attorneys

Nov. 7, 1967    L. V. GEWISS    3,351,441
SHAPE, CONSTITUTION AND PROCESSES FOR MANUFACTURING MATERIALS
DERIVED FROM DEVELOPABLE CHEVRONED CONFIGURATIONS
Filed Nov. 1, 1963    6 Sheets-Sheet 6

Inventor
Lucien Victor Gewiss

By Lane, Aitken, Dunner & Ziems
Attorneys

United States Patent Office 3,351,441
Patented Nov. 7, 1967

3,351,441
SHAPE, CONSTITUTION AND PROCESSES
FOR MANUFACTURING MATERIALS
DERIVED FROM DEVELOPABLE CHEV-
RONED CONFIGURATIONS
Lucien Victor Gewiss, Ville-d'Avray, France, assignor to
Marc Wood Societe Anonyme pour la Promotion des
Echanges Techniques Internationaux, Paris, France, a
company of France
Filed Nov. 1, 1963, Ser. No. 320,752
27 Claims. (Cl. 29—183)

Developable chevroned configurations are now well known. Their geometric forms, which are more or less complex, were defined, represented and described in copending application Ser. No. 514,171, filed June 9, 1955.

In said copending application Ser. No. 514,171 (which is hereby incorporated by reference herein and which is based upon French Patents 1,106,780 issued July 27, 1955; 66,807 issued Mar. 25, 1957; 67,078 issued May 13, 1957; and 68,479 issued Nov. 12, 1957) is described a novel type of material having a "chevroned" configuration which, in its more general appearance, has the form of a structure folded from a flat sheet or band whose folds, located alternately in one and then another limiting plane, are zig-zag or corrugated lines. As pointed out in said copending application, such chevroned structures have a configuration such as to present a succession of alternate protrusions and recesses, the walls of each protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°. (When used hereinafter in this specification and claims, the term "chevron structure" or "chevroned structure" shall be construed to have this definition.) The surfaces of this novel structure may be planar or curved in configuration, or both, but in all cases the structure meets the limitations set forth above. As is set forth in said copending application, one of the peculiar characteristics of the chevroned structure is that its surface is in actuality the materialization of a more or less complex geometric configuration which is developable along a plane (although the structure itself is not necessarily effectively developable).

The advantages of such chevroned structures are many and varied. For example, the fact that the chevroned structure is geometrically developable in form makes it possible to form such structure solely by means of folding operations performed on flexible (though not necessarily extensible) materials at extremely low cost. And due to the almost complete lack of deformation of the material as a result of such folding operation, the material may be formed through a much greater angle than would be the case with conventional forming techniques without significant danger of rupture of the material. This advantage would alone make the novel chevroned structures of applicant's copending application extremely significant and advantageous in and of itself. Still additional advantages of such structures are disclosed in said copending application.

It is known that the dual peculiarity which characterizes chevroned configurations is that, on the one hand, their two opposed main faces have furrows in them in the form of chevrons which are more or less narrow and whose broken or undulated flanks are exclusively constituted of adjacent ruled surfaces and that, on the other hand, these two named faces are consequently exclusively bounded by the broken or undulated ridge lines along which the flanks of the furrows join each other.

Chevroned structures are the materialization of these configurations. They are most generally obtained by proceeding with a manual or mechanical folding extending in two different directions of a sheet of pliable material.

Since the thickness of the sheet of which such structures are made cannot be nil, it is obvious that the shape of a chevroned structure, obtained by folding or otherwise, can only at best be that which results from a certain overlapping of the geometric configuration which it tends to materialize. Folding always produces at the inside of the folds a certain excess of material which naturally corresponds to an equivalent shortage of material at the outside of the folds. The defects in form which result therefrom are quite naturally more sensitive at the various points where several folds converge.

Local imperfections of this type would be without great consequence in themselves if, through cause and effect, they did not give rise in their vicinity to tensions which are transmitted from one edge of a flank to the other edge by producing substantial deformations of the intervening surfaces. Although these deformations are hardly visible, they nevertheless seriously affect the mechanical resistance of these structures. Indeed, it is the ruled surfaces of the flanks which, serving as inclined props balanced against each other in truss fashion, withstand the opposed loads exerted on the two main faces of the structure.

In order that the sheet material of which the flanks are constituted may offer, at the place it occupies in the structure, the maximum resistance to compression it is capable of offering, it is obviously necessary that the entire length of the straight lines along which the elementary load forces which are distributed all along the ridges and which are exerted from one face to the other be contained within the thickness of the sheet of material. If there exists a zone, even limited and very localized, where this condition is not satisfied, there is produced in this entire zone a local buckling and consequently a collapse of the material constituting the flanks.

In practice, a chevroned structure only offers the resistance to compression that the sheet material of which it is made is capable of offering to the extent that, despite its thinness, the entire sheet distributes itself as uniformly as possible on either side of the geometric configuration it materializes. In view of this very severe accuracy requirement, it will be easily understood that, in practice, no chevroned structure obtained through folding can be considered as having a shape which will take maximum advantage of the resistance characteristics offered by the material of which it is constituted.

The present invention has as its object various means which make it possible, on the one hand, radically to overcome these practical inadequacies by getting rid of the imperfections of the ridge lines resulting from the folding and, on the other hand, to increase the stiffness, the perfection of the shape, and ultimately the apparent thickness of the flanks of structures of the type in question.

A first method covered by the invention consists in subjecting the sheet of material to be folded to an initial pre-forming operation by proceeding with an embossing of its surface which starts the formation of the chevroned furrows of the structure to be made.

In principle, this first forming operation is carried as far in depth as the sheet of material will permit, taking into account the softening treatment to which it can be subjected for this purpose. Papers, cardboards and, in general, a large number of fibrous materials lend themselves to a rather deep pre-forming operation of this type particularly when the pliability of these materials has been previously improved by means of humidity or heat. Certain plastic sheet materials can easily have a chevroned configuration outlined in them by pre-forming when they are raised to a suitable temperature. Metal sheets can be pre-formed, either hot or cold, into the outline of a chevroned configuration provided the depth of penetration is limited as a function of the effective malleability of the metal used.

The pre-forming can be carried out either furrow by furrow or on as large a number of furrows at a time as desired. There is no other limit on this possibility than the size of the tooling which makes it possible.

The pre-forming makes it possible to obtain an outline whose folds are not very accentuated but whose developable form can be as near as is desirable to the chevroned geometric configuration in the state of contraction corresponding to this stage of the process.

When flattened out, this developable outline would occupy a larger area than that of the original sheet. One should be careful not to conclude that the various constituent parts of the sheet have, during the pre-forming, stretched an equal amount. Indeed, the fold lines along which, in the flat sheet, the ridge lines of the pre-forming tooling have exerted their force, have quite naturally been kept immobile. The elements of the fold lines have therefore been moved parallel and equal to each other in the outlined structure and only the areas outside of these lines have been able to participate in this stretching. Consequently, it is particularly the longitudinal fibers of the sheet which are stretched during the pre-forming. Be that as it may, the unequal stretching of the material of the flanks resulting from the pre-forming has the effect of smoothing out and stiffening in a very favorable manner the various lateral surfaces of the furrows in their two rectangular directions.

During the pre-forming operation, the pressure being exerted in particular on the ridges by the tools forms in the outline concave folds with sharp angles which can be, at least at the bottom of the furrows, completely free of defects. By subjecting the almost perfect outline thus formed to one of the known chevroning processes, more particularly the process described in copending application Ser. No. 315,618 filed Oct. 11, 1963, entitled "Process and Devices For Chevroning Pliable Sheet Material," whose disclosure is hereby incorporated herein by reference (a process which consists essentially of arranging the sheet of pliable material to be formed on one of the flat faces of at least one deformable assembly, either open or closed, constituted by a contractible chevroned structure whose ridge lines coincide with those of the chevroned structure to be formed but whose flanks are higher than those of the latter, and of subjecting this assembly to a contraction either by the effect of varying the pressure of a fluid or else by the action of mechanical forces simultaneously exerted on the walls or the ridges of the said assembly), structures are finally obtained which are much more perfect in form than structures obtained by simple chevron folding of the sheet. This improvement in form is due quite naturally both to the accuracy of the ridge lines and the flatness of the flanks resulting from the pre-forming.

In order to improve still further the forms obtained and, in addition, to facilitate the folding to a certain extent, it is possible, according to another improvement constituting one of the objects of this invention, to replace the sharp ridges of the pre-forming tooling whose design is that of the configuration to be reproduced by slightly rounded ridges encompassing more or less generously the theoretical ridge lines.

A rounded edge all along the ridges of the tooling has the effect of forming in the bottom of the furrows of the outline, and along their entire length, a sort of small trough due to the embossing which eliminates the sharp angle and the excess of material which would accumulate there. It therefore clearly marks, prepares and facilitates in advance the following operation of contracting the folds by pleating. Naturally, the practical improvement which results from this peculiarity of manufacture is possible only because a certain modification in form has been made in the structure with respect to the developable configuration which it materializes.

In the event the structure resulting from the chevroning operation still has in its final state of contraction certain defects, it is possible, according to another improvement constituting one of the objects of this invention, to subject this structure to a post-forming operation intended to impart to the said structure either a form which is as close as possible to the final chevroned configuration, or else another form derived more or less clearly from this configuration, to the extent it is necessary to correct the deficiencies resulting from its materialization.

By this post-forming, which can be effected by means of embossing tooling which acts on the bottom of the furrows of the structure along the valley lines bounding the flanks of these furrows, it is possible, for example, to round out slightly the bottom of the furrows such that the ridges of the folds on each of the two main faces of the structure will be replaced by rounds located more exactly at their limiting surface, whether this be flat, cylindrical or of any other shape.

Another improvement constituting one of the objects of this invention consists of no longer limiting chevroning to the folding of flat pliable sheets but of extending it to the folding of pliable sheets which are corrugated (with undulations or sharp accordion folds) or which are composites such as sandwich type materials. In this case, it is naturally desirable to orient the sheet to be chevroned such that the undulations or the folds in the case of corrugated materials or the "grain" in the case of sandwich materials provides the greatest resistance to crushing at the place they occupy in the flanks.

As can be imagined, the chevroning of undulated, folded or sandwich sheets of this types does not make it possible to form perfectly straight fold lines along the ridges of the flanks since the ridge folds take shape only by superimposing themselves on the folds in the material itself. By proceeding to the final shaping by means of post-forming or by more or less accentuated embossing of the ridge lines of such flanks, in the manner indicated above, it is easy to obtain structures of this type having their ridges strictly in the same limiting surface of each of the two principal faces.

Another method of stiffening the flanks of structures of the type in question consists, according to the invention, of making these structures out of sheets of materials which have been previously provided, on their two faces, with a series of embossed furrows of limited height, each of these series occupying the exact location of the future flanks of the structure.

In this method of execution, the limiting lengths of the furrows composing the various series are, in every case, the locations of the various ridge lines of the future structure. These limits merge, therefore, with the ridge lines themselves. The orientation of the furrows is that which is best capable of imparting to the flanks of the future structure, taking into account the design of the ridge lines, the maximum stiffness in the useful direction.

In order to permit the future flanks of this structure to approach each other freely despite a possible tight concentration of the folds of the structure, it is desirable to emboss the furrows alternately in opposite directions, each convex ridge of one flank, as a consequence, lodging inside the concave furrow of the flank facing it. Embossed sheets of this type therefore appear in the form of a cross hatching of furrows, which may be adjacent or not, alternately convex and concave, which exactly determine by their limits the ridge lines in the plane of the structure for which these sheets are intended.

Improved structures according to the invention, having as their elementary surfaces flanks of a rigidified sheet or a sandwich, interposed between ridges of the faces of the structure, are those which, for an equal quantity of material used in making them, make it possible to manufacture sandwich structures having the greatest resistance to both compression and flexure. Indeed, whatever might be the small local defects with which they can be affected, such structures resist any buckling because the thickness of the material involved is not the thickness of the sheet itself but of the envelope of the corrugation used for the material in the flanks.

The various improvements set forth above, relating to the ridges of the flanks or to the flanks themselves, can be applied to chevron structures either together or separately without departing from the scope of the present invention.

These improvements will be well understood with the help of the supplementary description below which refers to the annexed drawings and in which the examples serve as non-restrictive illustrations. In these examples.

Figures 1, 2, 3:
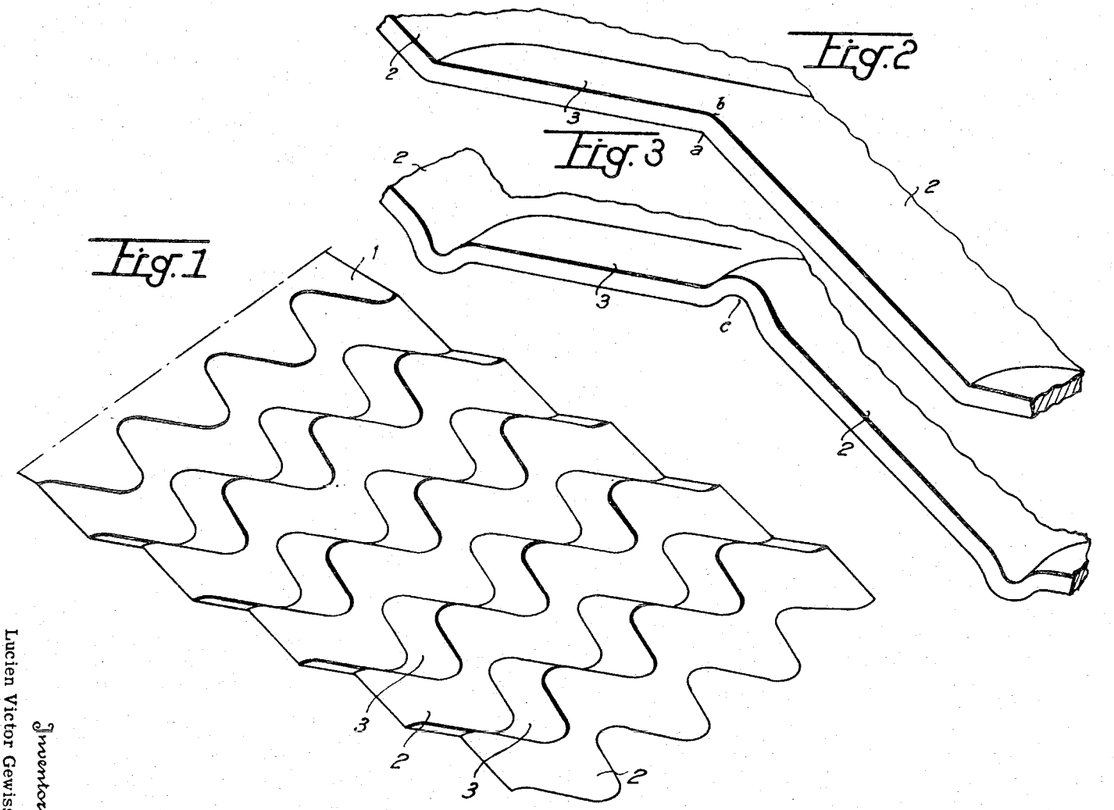
FIG. 1 represents, in perspective, a developable chevroned structure with undulated ridge lines in the process of formation in which it finds itself at the end of a pre-forming operation performed, for several furrows, on a sheet of material of unlimited length.
FIG. 2 is a partial view in perspective, on a larger scale, of one of the side edges of the pre-formed structure represented in FIG. 1.
FIG. 3 is a view similar to FIG. 2 representing one of the side edges of a structure identical to the preceding one but in which the pre-forming operation has made it possible to form a small rounded trough all along each of the ridge folds.

In the example in FIG. 1, there have been represented several furrows of a developable chevroned structure having undulated ridge lines, formed in a sheet of material 1 of indefinite length, such as they appear at the end of a pre-forming operation. Sheet 1 is constituted, for example, by a strong paper of the kraft type which has been previously somewhat humidified in an appropriate atmosphere. The material of the sheet could just as well be metal, plastic or any fibrous material. As can be seen in the drawing, the pre-forming was carried only to a very limited depth so as not to exceed the amount of stretching the material can withstand without being reduced in thickness in a substantial manner, but so that the traction applied to the surfaces of flanks 2 and 3 of the structure, particularly in the longitudinal direction, has the effect of flattening and stiffening them as much as possible. In this case, the pre-forming has been executed using tooling having a form intended to produce, taking into account the elasticity of the material, an outline of the structure which is as close as possible to the selected chevroned structure when it is at this stage of contraction.

FIG. 2, which represents on a large scale the edge of two consecutive flanks 2 and 3 of the pre-formed structure according to FIG. 1, shows that concave angle $a$ of the ridge folds thus formed is correct but that the outside of these ridges is affected by a round $b$ imposed by the thickness of the material.

FIG. 3 represents, in a similar manner, the edge of a structure identical to the preceding one but on which the pre-forming operation has made it possible to form a small trough $c$ created by embossing to a rounded shape all along each of the ridge folds. The inside of the folds is thus provided with a spacing which has the effect of separating in advance the neighboring flanks 2 and 3 which, during the subsequent folding operation, will approach each other. Thus is avoided the malformation which occurs, without this precaution, due to the excess of material on the inside of the folds.

When structures with broken ridge lines are involved, it can be desirable to take advantage of the pre-forming operation performed on the flanks to create small troughs of the type represented in FIG. 3, not only all along the broken ridge lines but also along the fold lines which connect them along their flanks.

By taking the precaution of having the hollows of the embossed troughs oriented naturally in the same direction as the hollows of the folds, it is quite obvious that the chevroned folding operation which follows the pre-forming operation will be greatly facilitated. The troughs thus formed impart moreover to the surfaces of the flanks comprised between them an additional transverse stretching which increases their own rigidity and insures that they will be flatter.

Also with a view to reinforcing the flanks of structures having undulated or broken ridge lines, it is further possible to take advantage of the pre-forming operation to produce on all or part of the surface of the flanks, small reinforcing troughs preferably oriented along the ruled lines of the flanks but having as longitudinal limits either the troughs of the ridge lines, if there are any, or the ridge lines themselves, if there are none. What is important is that these reinforcing troughs should have lateral limits in the surface of the flanks which are straight lines (and merged with the ruled lines of the flanks) and that these straight lines should connect either the ridges or the edges of the troughs of the ridges. In this manner, the opposed ridges of each of the flanks are connected together by fold lines which are straight lines and which, consequently, provide the surfaces of the flanks with the maximum rigidity.

By reason of the fact that the flanks are connected together at an acute angle and that, consequently, the protrusion of the reinforcing troughs of one flank is opposite to the reinforcing protrusion of the other flank if the two protrusions are in the same direction, it is desirable that they be in alternate directions. The most favorable solution consists in providing each of the flanks of the structure with alternately concave and convex embossings of this type and of inverting from one flank to the next the selected order so that the alternate protrusions and hollows of each flank face the hollows and protrusions respectively of the following flank. There is thus obtained not only a very natural lodging of the protrusions of the troughs in the hollows of the troughs from one flank to the next, but also a uniform and equal distribution of the protrusions over all the flanks. This distribution has the effect of doubling the effective cross-section of the flanks which resists buckling under compression compared with what it would be if all of the troughs were embossed in the same direction. The resistance of the flanks to buckling is therefore not only increased but is also perfectly balanced on either side of the means surface of the flanks.

Naturally, all of the troughs just described in connection with preforming, whether they follow the ridge lines or the fold lines between ridges of the broken structures, or whether they reinforce the surfaces of the flanks, can just as well be embossed in the flat sheet of material without proceeding at the same time toward the formation of a pre-formed outline of the future structure. In this case, the various troughs in either side of the flat sheet strictly along the path along which the various fold lines will have to form constitute the beginnings of the chevroned folding which remains to be effected. In addition to their reinforcing role, they therefore tend also to regularly facilitate the execution and the accuracy of the chevroned folding.

Figures 4, 5, 6:
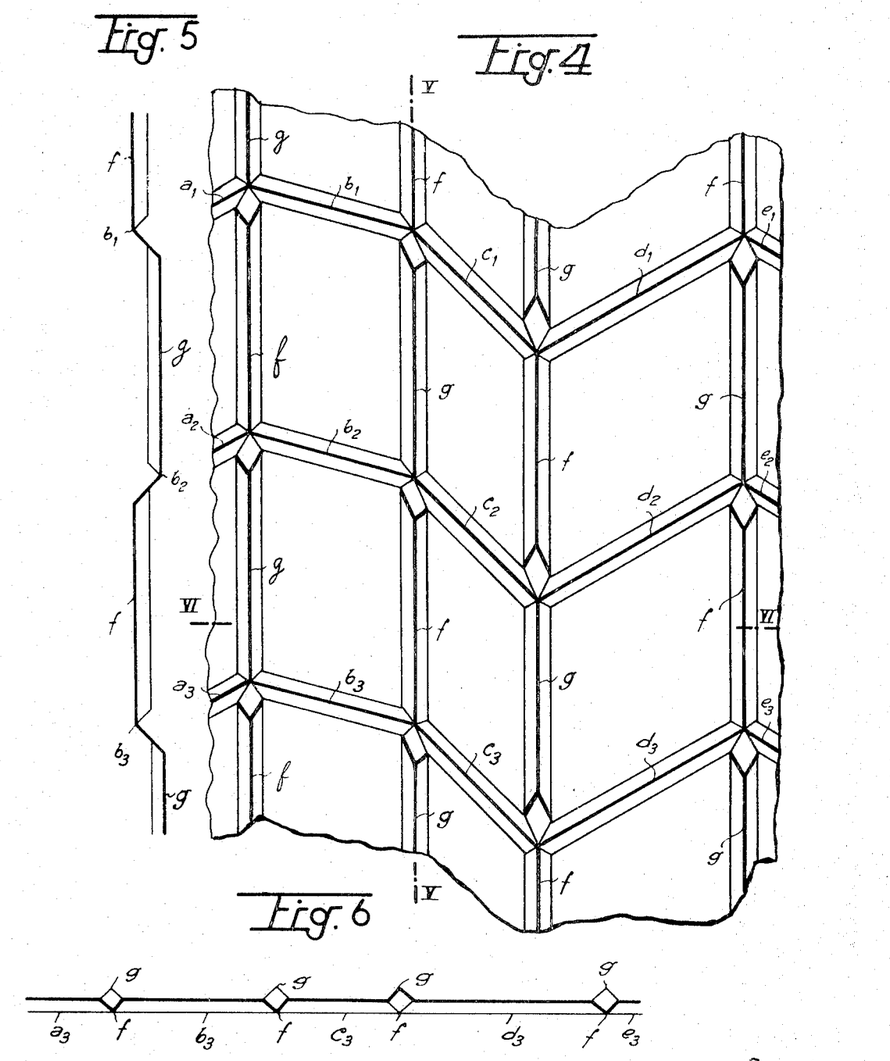
FIG. 4 represents the plan view, before chevroned pleating, of a fragment of a sheet of material which has received, while in flattened condition, a previous embossing forming troughs which mark the folds of the broken ridge lines of the chevroned structure to be formed as well as the folds which join the breaks which extend from one ridge to the other.
FIGS. 5 and 6 are respectively cross-sections along lines V—V and VI—VI of FIG. 4.

In FIG. 4 there has been represented a fragment of a sheet of material intended for the manufacture of a chevron structure having broken ridge lines which has been subjected while flat to an embossing which has formed troughs which mark the various folds of the structure, whether it be the folds of the broken ridge lines or the folds between ridges connecting the breaks. On the drawing, the troughs have been exaggerated in dimension in order to bring out clearly their forms, which in this case are of equal triangular cross-section. They could just as well be of semi-circular or rectangular cross-section or of any other shape. They could also be unequal.

The ridges of the future structure are naturally intended to be alternately folded in the concave and convex directions. Thus ridges such as $a_1$, $b_1$, $c_1$, $d_1$, $e_1$, and $a_3$, $b_3$, $c_3$, $d_3$, $e_3$ will be convex whereas ridges such as $a_2$, $b_2$, $c_2$, $d_2$, $e_2$ will be concave. From these alternate folds, it results that folds $f$ between ridges will be convex whereas folds $g$ between ridges will be concave. Since these peculiarities flow from the laws of chevroning which are now well known, the troughs of folds are embossed in such a manner that their convexity agrees with the convexity of the fold they follow.

The embossings located at $a_1$, $b_1$, $c_1$, $d_1$, $e_1$, at $a_3$, $b_3$, $c_3$, $d_3$, $e_3$, and at $f$ are therefore convex whereas the embossings located at $a_2$, $b_2$, $c_2$, $c_2$, $d_2$, $e_2$ and at $g$ are concave.

FIG. 4 shows clearly that the edges of the embossings between ridges connect the edges of the embossings of the ridges. This condition must be satisfied in order for the rigidity of the flanks to be properly insured. The connections which result from the embossings of concave and convex folds are represented by the cross-sections in FIGS. 5 and 6.

An examination of FIGS. 4, 5 and 6 will clearly show that the troughs do constitute good beginnings of the chevroned folding of the future structure since they are oriented in the direction along which the folds must form and that nothing in the hollows of the troughs prevents the folding. It should be noted, moreover, that the embossings appear with respect to each other in such a way as not to have their protrusions in opposition to each other during the course of the folding, but on the contrary so as to have them intermesh in each other, even when the chevroning is carried to the stage of maximum contraction.

Figures 7, 8:
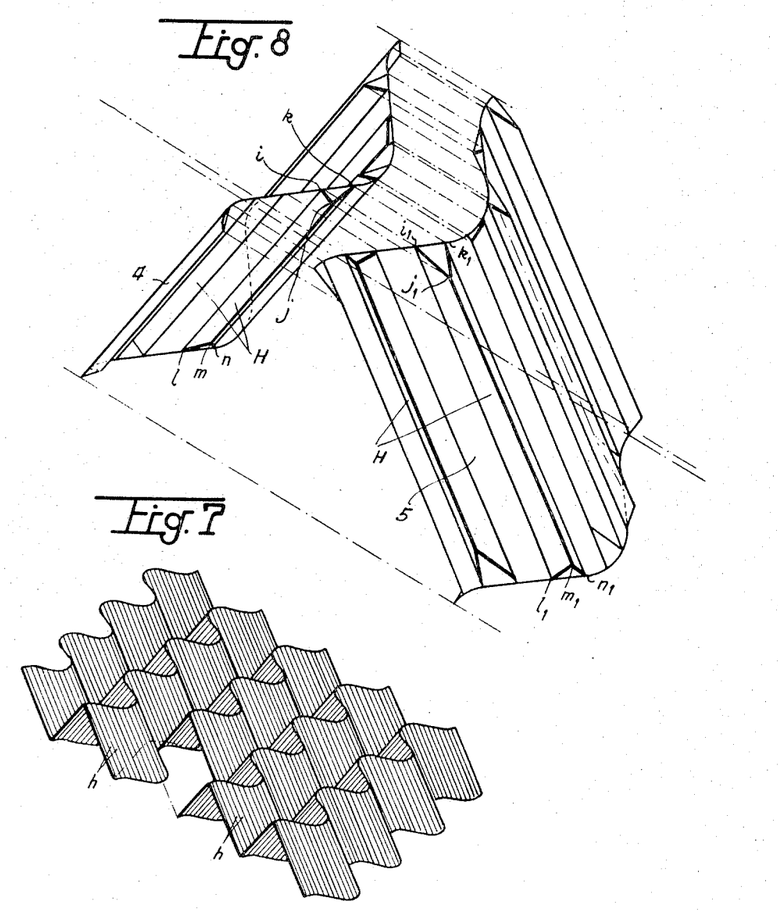
FIG. 7 is a perspective view of a chevroned structure with undulated ridge lines whose flanks have been provided with reinforcing troughs.
FIG. 8 represents in perspective, on a larger scale, two portions of flanks extracted from the structure represented in FIG. 7.
Figure 9:
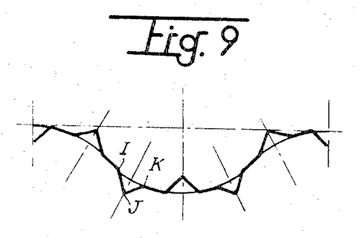
FIG. 9 represents a right-angle cross-section common to each of the two flanks in FIG. 8.

There has been represented in FIG. 7 in a perspective view a chevroned structure having undulated ridge lines whose flanks have been provided with reinforcing troughs and in FIG. 8, a view, also in perspective but on a larger scale, of two portions of flanks 4 and 5 extracted from this structure, FIG. 9 representing a cross-section taken at right angles of one of these two portions of flanks. To simplify the drawing, FIG. 7, in which there is missing the two portions of the flanks of FIG. 8, was executed on a small scale and without any other indication of the presence of the reinforcing troughs than the cross hatching $h$ which covers the flanks. In contrast, FIG. 8, on a large scale, brings out clearly the form of troughs H, which in this case have a triangular cross-section. However, in this figure, the two portions of flanks represented, which were taken from two adjacent flanks in FIG. 7, have been separated from each other in order to bring out clearly the peculiarities of the reinforcing troughs which have been formed in their surface over one complete undulation, while at the same time keeping the inclination of the said troughs due to the perspective.

It should be noted that in this particular case the structure does not comprise fold troughs along the undulated ridge lines. It is therefore directly to the undulated ridges that the ends of the triangular cross-section troughs of the flanks connect.

For every undulation of the flank as represented in FIGS. 8 and 9 it can be clearly seen that there are five troughs comprised between the two half troughs of the points of inflection. Altogether that makes three convex troughs and three concave troughs. It will be observed that the cross-sections taken at right angles of flanks 4 and 5 being the same, the protrusions of the reinforcing troughs of one flank naturally find their recesses within the hollows of the troughs of the other flank and vice versa. The triangular cross-sectioned surface where the embossings connect with the undulated ridge lines appears in the form of a curved triangle which, naturally, is not completely flat. There can be clearly seen the two curved triangles $ijk$ and $lmn$ which limit one of the troughs H on flank 4. There can also be seen the two curved triangles $i_1$, $j_1$, $k_1$ and $l_1$, $m_1$, $n_1$ located at the ends of one of the troughs H of flank 5. On the cross-section taken at right angles shown in FIG. 9 which is common to both flanks 4 and 5, the two troughs just mentioned are represented by the V IJK. It will be observed that all of the edges of the troughs, such as $ilnk$ and $i_1l_1n_1k_1$ are directly connected to the undulated ridge lines.

The reinforcing troughs of the flanks can be embossed in the flat sheet before chevron folding. In this case they are located side by side and parallel to each other and are alternately concave and convex between ridge lines. Despite the fact that the reinforcing troughs are aligned in alternate hollows and protrusions from one flank to the other, their edges are the extensions from one to the next in exactly the same manner as are the troughs of the folds in FIG. 4.

The reinforcing troughs can also be embossed in the flanks after the structure has been chevroned to a certain stage of contraction. The cross-section taken at right angles in FIG. 9 shows that indeed the entire forming tool can withdraw without difficulty from the flank material after embossing.

Figure 9A:
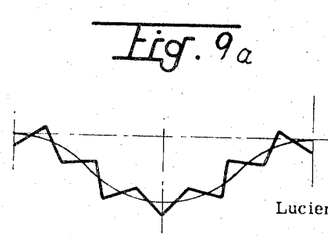
FIG. 9a is a right-angle cross-section of a variation in the embodiment of the portions of flanks in FIG. 8.

What has been set forth with respect to the reinforcing troughs of the folds and the faces of the structures confirms that all of the contemplated arrangements can be applied together or separately, in the flat sheet as well as during pre-forming or after it has been pre-formed up to a certain stage of contraction of the folds. Thus, it is possible to have reinforcing troughs distributed in all sorts of ways and, in particular, to have adjoining troughs. FIG. 9a represents the cross-section of a portion of the flank shown in FIG. 8 in the case where twelve reinforcing troughs have been embossed adjacently in its surface.

In the examples which have just been described with reference to FIGS. 1–9a, there has only been contemplated, as in the technology known until now for the manufacture of chevroned structures, the forming of sheets of material having at the outset a smooth surface. Indeed, even in the case where reinforcing troughs are embossed in the flat sheet all along the future ridge lines or flanks, it is still a smooth sheet of single thickness which receives the chevroned folding. As was indicated above, the invention also contemplates the application of the chevroning operation to the forming of pliable sheets whose surface is not smooth, they having been initially molded or reinforced so as to be stiffened in at least one principal direction of their plane.

Figures 10, 11, 12, 13, 14, 15, 16, 17:
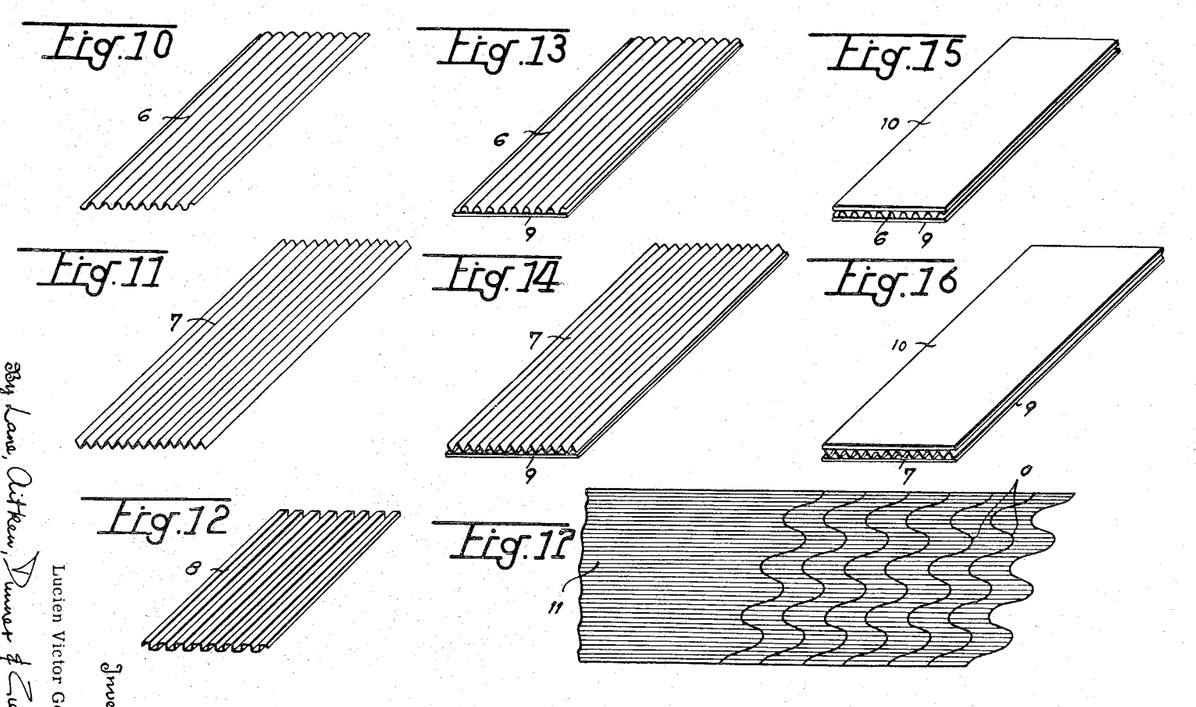
FIGS. 10–12 represent respectively, in perspective, three types of undulated or folded sheets susceptible of being used for making chevroned structures of the type represented in FIG. 6.
FIGS. 13 and 14 represent respectively the sheets in FIGS. 10 and 11 covered on one of their faces with a flat sheet.
FIGS. 15 and 16 represent respectively the sandwiches obtained by covering the same sheets with a flat sheet on each of their two faces.
FIG. 17 is a top plan view of a folded sheet on the surface of which have been pre-formed the folds of the undulated ridges of the future chevroned structure for which this sheet is destined.

Sheets of this type include not only sheets of material whose surface has been embossed with hollows and reliefs intended, by their design, to provide as effective a reinforcement as is desirable, but also sheets which have been simply corrugated with undulations or accordion folds and certain of the sandwich type materials which offer the desirable rigidity. Paper, metal and plastic materials are already commercially available in the form of sheets corrugated with undulations or accordion folds. Corrugating machines moreover make it possible to form on the smooth surface of the sheets undulations and accordion folds of all shapes and dimensions either lengthwise or crosswise in the sheet. For example, FIG. 10 represents in perspective an undulated sheet 6 susceptible of being used for an embodiment of the invention. FIG. 11 is a similar view of a sheet 7 folded in accordion folds and FIG. 12 shows a sheet 8 provided with rectangular folds.

Sandwich materials are also known of the corrugated paperboard type, consisting of an area of paper folded or channeled transversely and covered on one or both of its faces with a sheet of paper having a smooth surface. FIGS. 13 and 14 represent such materials consisting of sheets corrugated respectively with undulations and accordion pleats 6 and 7 similar to those of FIGS. 10 and 11 and covered on one of their faces with a sheet having a smooth surface 9, whereas FIGS. 15 and 16 represent respectively sandwiches obtained by covering the same sheets 6 and 7 with smooth sheets 9 and 10 on both of their faces.

It is sheets corrugated wtih undulations or accordion pleats or sheets of sandwich materials such as are represented in FIGS. 10–16 described above which can be used directly, with or without preparation, to constitute the chevroned structures with rigid flanks which are the subject of this invention. Naturally, the orientation of the folds of the sheets involved must be such that the line of greatest rigidity of the flanks of the finished structure must be in the direction along which the structure will have to resist the forces, i.e., between ridges and parallel to the fold lines or lines of inflection of the flanks. This is the same as saying that the direction of the undulations of the folds of these sheets must be perpendicular to the general direction of the folds of the structure to be formed.

Seen in this way, it will be understood that by marking the accordion folded or undulated sheet or the sheet of sandwich material with the location of the lines of ridge folds as well as the lines of the folds in the flank surfaces (if there are any), the folds are pre-formed and, consequently, the chevroning is efficiently prepared. To mark the fold lines, knives or blades can be used of the type which are used for marking on the surface of the material utilized the fold lines which make it possible to make corrugated paperboard boxes.

FIG. 17 represents, seen from above, an accordion pleated sheet 11 on the surface of which have been pre-formed the undulated ridge folds o of the future chevroned structure for the production of which this accordion pleated sheet is intended. It can be imagined that along the ridge lines o the folds in the sheet have been crushed by the marking. They have therefore been reduced to the same level. The lines marked in this manner are therefore lines of weakness along which all rigidity has been eliminated. Chevroning of such a sheet is therefore extremely simple. It can be executed without difficulty by one of the forming processes cited above.

Naturally, the marking which has just been described is just as valid for preparing for chevroning the folds of sandwich type sheets and, in particular, the folds of corrugated paperboard. It is moreover by this process that corrugated paperboard is folded either perpendicular or parallel to its corrugations to manufacture paperboard boxes. The marking crushes the corrugated core between the two sheets covering it and makes it possible, because of this, to form without difficulty the ridge line folds. The fold lines or inflection lines of the flanks which are parallel to the corrugations are very easily formed since corrugated paperboard is flexible in this direction.

As far as sheets with very small corrugations are concerned, particularly very thin metal ones, it is generally not necessary to proceed with pre-forming by marking. The chevroning processes which are the subject of said co-pending application Ser. No. 315,618 make it possible to obtain very well formed structures without performing this operation. Under these conditions, the forming process described for sheets of material having a smooth surface is applied directly to the corrugated sheets.

Figure 18:
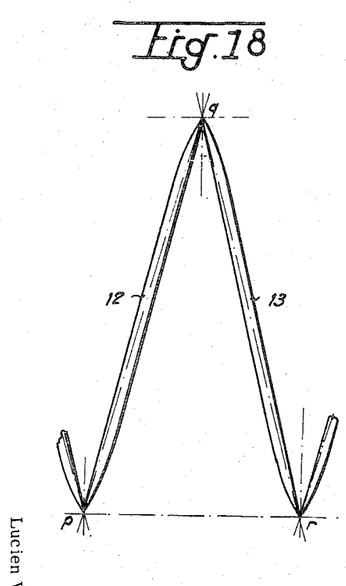
FIG. 18 is a cross-sectional view, at right angles, of two consecutive flanks of a chevroned structure made out of a very thin metal sheet folded in small undulations of one of the types represented in FIGS. 10 and 11.

FIG. 18 represents, in a cross-section taken at right angles, two consecutive flanks 12 and 13 of a chevron structure made from a very thin metal sheet having very small undulated or accordion folded corrugations (of the type shown in FIGS. 10 and 11). It can be seen that if $pq$ and $qr$ are the directions of the flanks from one ridge to the other, the opposing ridges of the corrugations of the sheet are slightly to one side or the other of it though they still encompass it. This asymmetry is due to the fact that the corrugations on opposite sides of the corrugated sheet merge at $p$, at $q$ and at $r$ in order to lend themselves to the formation of the chevroned ridge folds which naturally imposes, on the flanks of the structure, reinforcing lines of equal length. These reinforcing lines which, due to this fact, necessarily meet at $pqr$, etc., are no longer straight lines as they were in the flat sheet, at least in the vicinity of the ridge lines of the structure. Nevertheless, what is important is that these reinforcing lines are still located on either side of straight lines $pq$ and $qr$ along which the forces are transmitted from one face to the other in the structure. The substitution of a corrugated sheet for a sheet with a flat surface therefore has the effect of increasing the resistance of any chevroned structure.

The foregoing shows that the deeper the corrugations are in the sheet of material used the greater is this increase in resistance.

Figure 19:
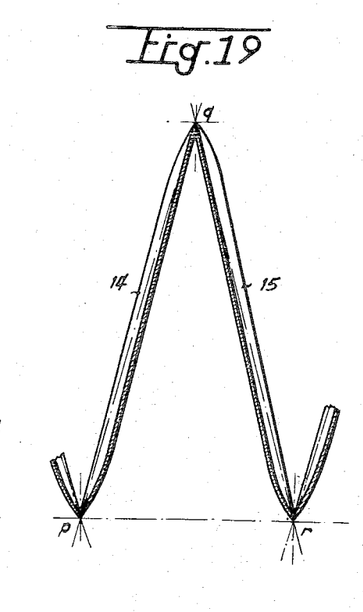
FIGS. 19 and 20 are respectively cross-sections similar to FIG. 18 of two consecutive flanks of two chevroned structures made, in one case, out of a sheet of smooth paper bonded to corrugated paper as represented in FIGS. 13 and 14 and, in the other case, out of ordinary corrugated paperboard of one of the types represented in FIGS. 15 and 16.
Figure 20:
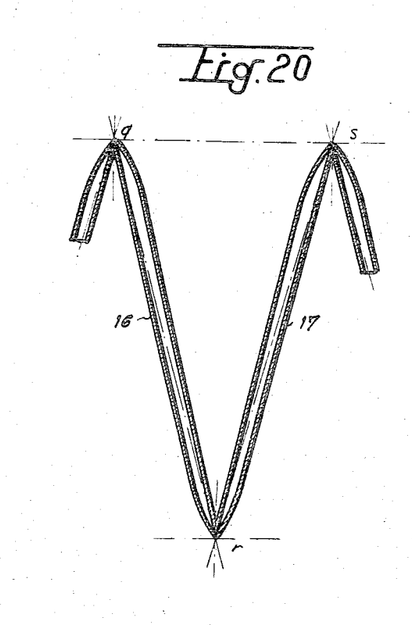

FIGS. 19 and 20 respectively represent two cross-sections similar to the preceding one taken from flanks 14, 15 and 16, 17 of two chevroned structures, one of which consists of a single sheet of smooth paper bonded to a corrugated sheet (FIGS. 13 and 14) and the other of which consists of ordinary corrugated paperboard (FIGS. 15 and 16). It can be seen that the corrugations and the sheets arrange themselves exactly as do the reinforcing lines of FIG. 18.

Naturally, the addition of one or two smooth sheets supported by corrugations greatly reinforces the surfaces of the flanks since they contribute toward increased rigidity. Nevertheless, the same little defects appear in the vicinity of the ridge folds of the structure. This can be corrected by proceeding, as was explained previously, with a post-forming operation which makes the shape more accurate and uniform.

Figure 21:
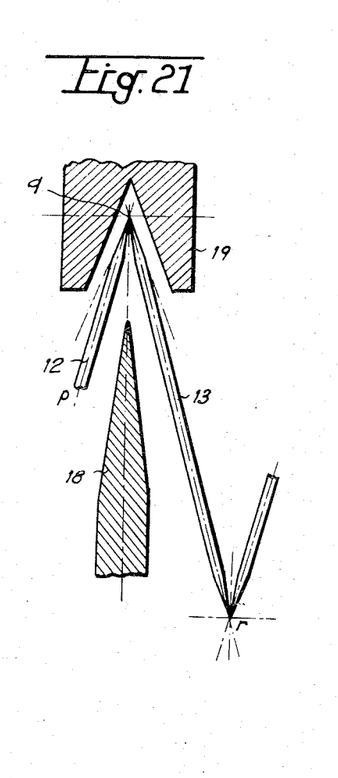
FIGS. 21 and 22 represent respectively the appearance of the flanks of the structure represented in FIG. 18 after two different post-forming operations have been performed on the fold of their ridge lines.
Figure 22:
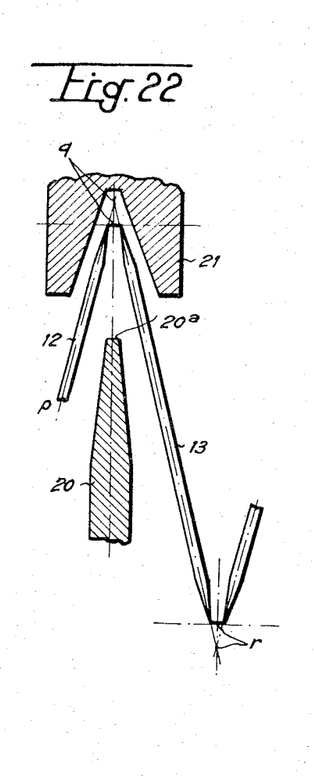

FIGS. 21 and 22 represent the two aspects that flanks 12 and 13 of the structure represented in FIG. 18 have after two different post-forming operations have been performed on the corrugations of their ridge lines. It can be seen in FIG. 21 that it was possible to re-establish correctly the symmetry between the reinforcing corrugations of the two opposite sides of the original corrugated sheet with respect to their median plane, by means of the action of a male forming die 18 having a rounded acute angle, effected inside a female die 19. The same observation can be made in FIG. 22 after the male forming die 20, whose summit has a small flat part 20a with rounded edges, has spread apart flanks 12 and 13 and crushed the ridge folds inside female die 21.

Naturally, the form of the male and female dies of the post-forming tooling can vary more or less depending on the design of the structure to be perfected and its end use. Thus, forms of the type represented in FIG. 3 can be adopted to perfect structures made from flat sheets or sheets of the type shown in FIGS. 10–12.

The improvements in form thus obtained by a more or less pronounced embossing which affects the ridge fold lines as well as a part of the flanks of the structures result in structures which have forms which depart slightly from developable chevroned configurations. These structures, however, retain, to the full extent of its utility, the ruled surface character of the flanks which constitute the superiority of chevroned structures.

The new forms of structures thus created, as well as sandwich materials made from such structures, are comprised in this invention, by way of new industrial products.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a method of forming a chevroned structure from a sheet of material, the improvement comprising subjecting said sheet to a pre-forming operation in which the ridges of the desired chevroned structure are partially formed; alternate ones of said ridges being moved in substantially opposite directions from one another; the paths of movement of said ridges during said preforming operation being substantially parallel to one another and substantially perpendicular to the mean plane of said sheet; said sheet being provided, at points between said ridges coinciding with the ruled elementary surfaces to be formed on said sheet in the ultimately desired chevroned structure, with a plurality of reinforcing furrows; the ends of said furrows connecting two ridges to one another.

2. A method as defined in claim 1 wherein the lateral limits of said furrows are linear in the direction of linearity of the ruled surfaces to be formed in the ultimately desired chevroned structure.

3. In a method of forming a chevroned structure from a sheet of material, the improvement comprising forming a plurality of furrows in said material at points coinciding with the ruled elementary surfaces located between the ridges of the ultimately desired chevroned structure; the ends of said furrows being located at points coinciding with said ridges.

4. A method as defined in claim 3 wherein troughs are formed at the points of concavity of said ridges, the ends of said furrows connecting the troughs of two ridges with one another.

5. A method as defined in claim 3 wherein the lateral limits of said furrows are linear in the direction of linearity of the ruled surfaces of the ultimately desired chevroned structure.

6. A method as defined in claim 3 wherein successive furrows in a direction from one ridge to the next are alternately convex and concave.

7. A method as defined in claim 6 wherein successive furrows in a direction between and substantially parallel to two successive ridges are alternately convex and concave.

8. A method as defined in claim 3 wherein said furrows are imparted to the material of the ultimately desired chevroned structure before any of the ridges of said chevroned structure have been formed in said material.

9. A method as defined in claim 3 wherein said furrows are imparted to the material of the ultimately desired chevroned structure after the ridges of the desired chevroned structure are at least partially formed.

10. A method of forming a chevroned structure comprising using material containing alternating convexities and concavities in substantial parallelism with one another and forming the ridges of said chevroned structure in a direction transverse to said convexities and concavities; said convexities and concavities occupying at least a portion of the ruled elementary surfaces of the ultimately desired chevroned structure.

11. A method as defined in claim 10 wherein said material contains a skin bonded to the outermost extremities of said convexities on at least one side of said material.

12. A method as defined in claim 10 wherein said material is a sandwich structure, in which a skin is bonded to the outermost extremities of the convexities on each side of said material.

13. A method as defined in claim 10 wherein said convexities and concavities are linear in the direction of said parallelism, said direction being the direction of linearity of the ruled surfaces of the ultimately desired chevroned structure.

14. A method as defined in claim 10 wherein said ridges are formed by crushing said convexities and concavities along the outline of said ridges, said crushing being sufficient to facilitate the formation of said ridges through a folding operation.

15. A method as defined in claim 10 wherein, after said chevroned structure has been formed, the shape of the concavities of the ridges of said structure is modified so that symmetry between the convexities and concavities on opposite sides of said material with respect to the median plane of said material is more closely approached.

16. A method as defined in claim 15 wherein said symmetry is more closely approached by applying a force to the said material in said concavities and at the location of said ridges, said force modifying the shape of said material at its point of application.

17. A method as defined in claim 16 wherein said force is applied by means of a shaping tool.

18. A chevroned structure containing a plurality of furrows in the material thereof at points coinciding with the ruled elementary surfaces located between the ridges of the structure; the ends of said furrows being located at points coinciding with said ridges.

19. A chevroned structure as defined in claim 18, said structure having troughs at the points of concavity of said ridges, the ends of said furrows connecting the troughs of two ridges with one another.

20. A chevroned structure as defined in claim 18 wherein the lateral limits of said furrows are linear in the direction of linearity of said ruled elementary surfaces.

21. A chevroned structure as defined in claim 18 wherein successive furrows in a direction from one ridge to the next are alternately convex and concave.

22. A chevroned structure as defined in claim 21 wherein successive furrows in a direction between and substantially parallel to two successive ridges are alternately convex and concave.

23. A chevroned structure as defined in claim 18 wherein furrows which existed at the ultimate location of said ridges prior to the formation of said chevroned structure have been reduced to substantially the same level at the location of said ridges in said chevroned structure.

24. A chevroned structure as defined in claim 18 wherein the concavity or convexity of successive furrows in a direction from one ridge to the next and on a given side of said chevroned structure is the same.

25. A chevroned structure as defined in claim 24 wherein said chevroned structure contains a skin bonded to the outermost extremities of said furrows on at least one side of said structure.

26. A chevroned structure as defined in claim 24 wherein said chevroned structure contains a skin bonded to the outermost extremities of the furrows on each side of said structure.

27. A chevroned structure as defined in claim 24 wherein the convexities and concavities of the ridges of said structure are substantially symmetrical on opposite sides of the median plane of the material of said structure.

References Cited

UNITED STATES PATENTS

| | | | |
|---|---|---|---|
| 1,847,216 | 3/1932 | Hubbard | 29—180 |
| 2,896,692 | 7/1959 | Villoresi | 161—133 |
| 2,901,951 | 9/1959 | Hochfeld | 156—592 |
| 2,963,128 | 12/1960 | Rapp | 189—34 |

DAVID L. RECK, *Primary Examiner.*

R. O. DEAN, *Examiner.*